United States Patent
Brin et al.

(10) Patent No.: US 10,920,661 B2
(45) Date of Patent: Feb. 16, 2021

(54) TURBINE BYPASS FOR ENGINE WITH DRIVEN TURBOCHARGER

(71) Applicant: SuperTurbo Technologies, Inc., Loveland, CO (US)

(72) Inventors: Jared William Brin, Loveland, CO (US); Thomas Waldron, Loveland, CO (US); Ryan Sherrill, Loveland, CO (US)

(73) Assignee: SUPERTURBO TECHNOLOGIES, INC., Loveland, CO (US)

( * ) Notice: Subject to any disclaimer, the term of this patent is extended or adjusted under 35 U.S.C. 154(b) by 47 days.

(21) Appl. No.: 16/109,581

(22) Filed: Aug. 22, 2018

(65) Prior Publication Data

US 2019/0136754 A1   May 9, 2019

Related U.S. Application Data

(60) Provisional application No. 62/554,822, filed on Sep. 6, 2017.

(51) Int. Cl.
*F02B 37/18* (2006.01)
*F02D 41/02* (2006.01)
(Continued)

(52) U.S. Cl.
CPC .............. *F02B 37/186* (2013.01); *F01N 3/00* (2013.01); *F01N 13/009* (2014.06); *F01N 13/08* (2013.01); *F01N 13/10* (2013.01); *F02B 37/00* (2013.01); *F02B 37/04* (2013.01); *F02B 37/10* (2013.01); *F02B 37/105* (2013.01); *F02B 37/18* (2013.01); *F02B 39/00* (2013.01); *F02B 39/04* (2013.01); *F02B 39/10* (2013.01); *F02D 23/00* (2013.01); *F02D 41/0007* (2013.01); *F02D 41/024* (2013.01); *F02M 26/00* (2016.02); *F02M 26/05* (2016.02); *F02M 26/06* (2016.02); *F02M 26/07* (2016.02); *F02M 26/42* (2016.02); *F01N 2240/36* (2013.01); *F01N 2340/06* (2013.01); *F01N 2410/00* (2013.01); *F02D 2200/0802* (2013.01)

(58) Field of Classification Search
CPC ........ F02B 37/04; F02B 37/10; F02B 37/105; F02B 37/11; F02B 37/18; F02B 37/183; F02B 37/186; F02B 37/22; F02B 39/10; F02D 41/024; F02D 41/007; F01N 2340/06; F01N 13/08; F01N 13/10; F02M 26/05
USPC .... 60/602, 605.1, 605.2, 607, 608, 609, 280
See application file for complete search history.

(56) References Cited

U.S. PATENT DOCUMENTS

| | | |
|---|---|---|
| 8,302,385 B2 | 11/2012 | Sujan |
| 8,561,403 B2 | 10/2013 | VanDyne et al. |
| 8,608,609 B2 | 12/2013 | Sherrill et al. |
| 8,668,614 B2 | 3/2014 | Sherrill et al. |
| 9,581,078 B2 | 2/2017 | Brinks et al. |
| 9,670,832 B2 | 6/2017 | Sherrill et al. |
| 9,909,517 B2 | 3/2018 | Kothandaraman et al. |

(Continued)

*Primary Examiner* — Mark A Laurenzi
*Assistant Examiner* — Mickey H France
(74) *Attorney, Agent, or Firm* — Cochran Freund & Young LLC; William W. Cochran (57) ABSTRACT

Disclosed is a turbine bypass for an engine with a driven turbocharger. During engine cold start, or periods of idle or low load engine operation, the bypass can be utilized to direct hot exhaust gasses directly to an exhaust aftertreatment. This provides higher temperatures to the exhaust aftertreatment, increasing the ability to eliminate harmful emissions such as NOx. The driven turbocharger can still provide boost to the engine through supercharging, so that engine torque and power can be maintained while the turbine bypass is in operation.

19 Claims, 7 Drawing Sheets

(51) Int. Cl.
*F02D 23/00* (2006.01)
*F02D 41/00* (2006.01)
*F02M 26/00* (2016.01)
*F01N 13/08* (2010.01)
*F01N 13/10* (2010.01)
*F02B 39/10* (2006.01)
*F02B 39/04* (2006.01)
*F02M 26/07* (2016.01)
*F02M 26/06* (2016.01)
*F02B 39/00* (2006.01)
*F01N 13/00* (2010.01)
*F02M 26/05* (2016.01)
*F02B 37/10* (2006.01)
*F02M 26/42* (2016.01)
*F02B 37/04* (2006.01)
*F02B 37/00* (2006.01)
*F01N 3/00* (2006.01)

(56) References Cited

U.S. PATENT DOCUMENTS

| | | | |
|---|---|---|---|
| 2002/0134072 A1* | 9/2002 | Fujieda | F01N 3/20 60/280 |
| 2010/0199666 A1* | 8/2010 | VanDyne | F02B 37/105 60/605.2 |
| 2011/0107739 A1* | 5/2011 | Shimizu | F01N 3/2006 60/273 |
| 2012/0017587 A1* | 1/2012 | Yoshida | F01N 3/0835 60/602 |
| 2014/0109553 A1* | 4/2014 | Roberts, Jr. | F01N 3/0814 60/274 |
| 2014/0325981 A1* | 11/2014 | Rabhi | F02B 37/164 60/600 |
| 2014/0325983 A1* | 11/2014 | Tsunooka | F02D 41/0007 60/602 |
| 2016/0010528 A1* | 1/2016 | Light-Holets | F01N 3/208 60/274 |
| 2017/0044948 A1* | 2/2017 | Caine | F01N 3/0885 |
| 2017/0335805 A1* | 11/2017 | Zhang | F01P 3/20 |

\* cited by examiner

TURBINE BYPASS FOR ENGINE WITH DRIVEN TURBOCHARGER

BACKGROUND

Driven turbochargers are an improvement over normal turbochargers since driven turbochargers (super-turbochargers) are powered by more than just the exhaust gas turbine, which provides for additional operating modes through supercharging.

SUMMARY

An embodiment of the present invention may therefore comprise a turbine bypass for a driven turbocharger for an engine comprising: an exhaust manifold of the engine coupled to a turbine of the driven turbocharger; exhaust aftertreatment located downstream of the turbine; a bypass valve coupled to the exhaust manifold that can be opened to provide exhaust gasses from the exhaust manifold through the turbine bypass directly to the exhaust aftertreatment during cold start or low load and idle conditions of the engine to provide additional heat to the exhaust aftertreatment.

An embodiment of the present invention may therefore further comprise a method of providing exhaust gasses from an exhaust manifold of an engine through a turbine bypass directly to an exhaust aftertreatment comprising: coupling a turbine of a driven turbocharger to the exhaust manifold; coupling a bypass valve to the exhaust manifold that can be opened to provide the exhaust gasses from the exhaust manifold through the turbine bypass directly to the exhaust aftertreatment to provide additional heat to the exhaust aftertreatment; powering a compressor of the driven turbocharger from the engine to provide boosted airflow to the engine when the turbine bypass is active.

An embodiment of the present invention may therefore further comprise a method of controlling heat flow to exhaust aftertreatment for an engine comprising: coupling a driven turbocharger to the engine; providing an electronic controller; measuring a temperature of the exhaust aftertreatment; opening a bypass valve to provide exhaust gasses through a turbine bypass to the exhaust aftertreatment when the temperature of the exhaust aftertreatment is below an operational threshold.

DETAILED DESCRIPTION OF THE EMBODIMENTS

Figure 1:
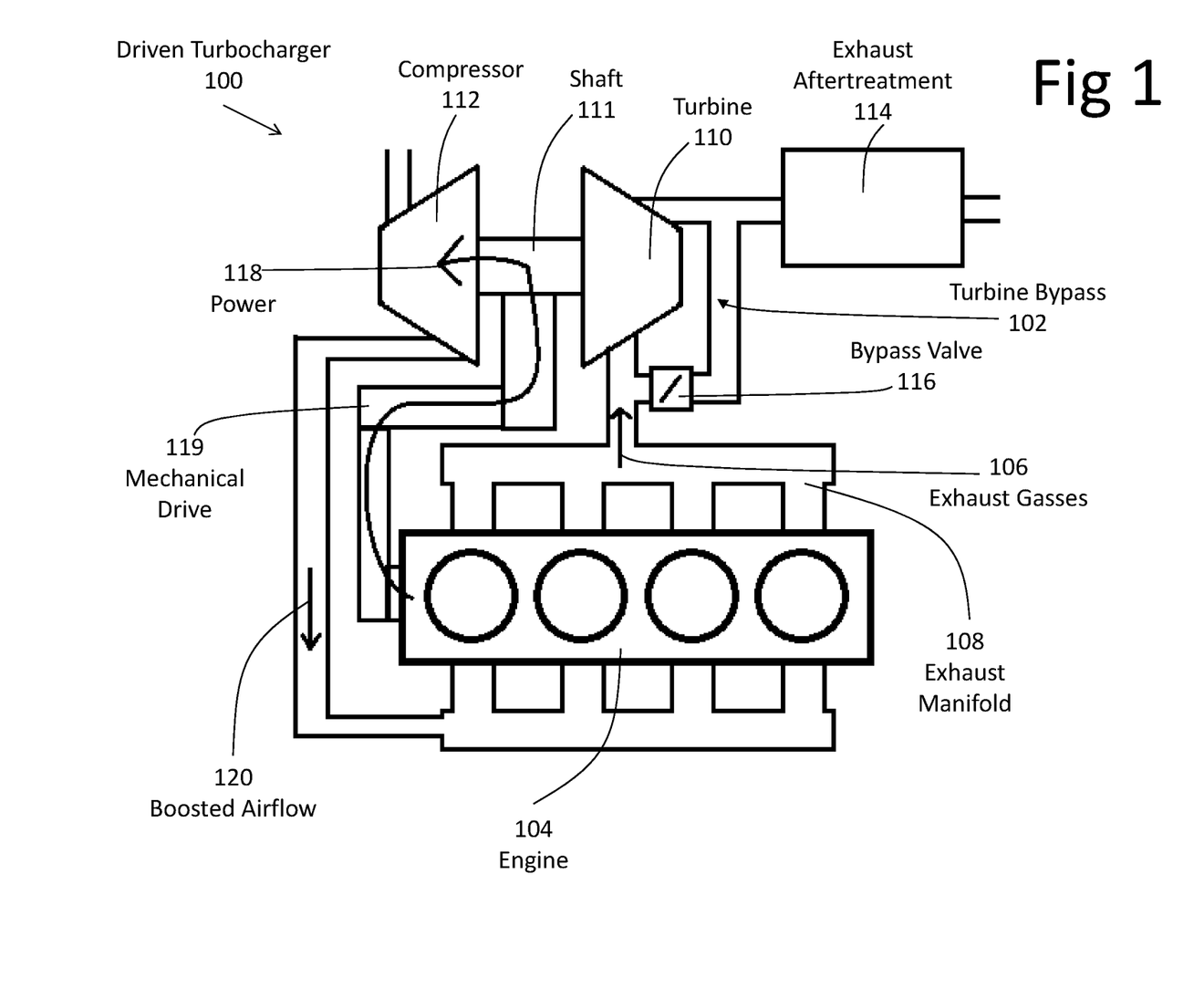
FIG. 1 is a schematic of a driven turbocharger with a turbine bypass for an internal combustion engine.

FIG. 1 is a schematic of a driven turbocharger 100 with a turbine bypass 102 for an internal combustion engine 104. To meet emissions standards, it is important that exhaust aftertreatment is quickly brought up to operating temperatures during engine cold start, as well as maintained at operating temperatures during low load or idle engine operation. A turbine bypass valve can be used to direct hot engine exhaust gasses directly to the exhaust aftertreatment to provide increased temperatures to the exhaust aftertreatment so that the exhaust aftertreatment is effective. The driven turbocharger can still provide boost to the engine through supercharging, so that the power and torque capability of the engine during use of the turbine bypass is maintained. Engine 104 produces exhaust gasses 106, which are directed to exhaust manifold 108. During normal operation, exhaust gasses 106 flow from exhaust manifold 108 to turbine 110 of driven turbocharger 100, providing power to turbine 110, which in turn drives compressor 112 via shaft 111. Downstream of turbine 110 is exhaust aftertreatment 114, which reduces the amount of harmful chemicals in exhaust gasses 106 such as NOx and particulate matter. During cold start of engine 104, as well as other low load and idle operation conditions of engine 104, the temperature of exhaust gasses 106 may be too low to sufficiently heat exhaust aftertreatment 114 after passing through turbine 110. Exhaust aftertreatment 114 must reach a certain elevated temperature to function properly, and quickly reaching this temperature and maintaining it is important to minimize the release of harmful emissions. During these periods of cold start, low load, and idle conditions, turbine bypass 102 is utilized to redirect exhaust gasses 106 around turbine 110 and directly to exhaust aftertreatment 114. This may be accomplished by opening a bypass valve 116 that allows exhaust gasses 106 to flow through turbine bypass 102. Opening bypass valve 116 provides higher temperature exhaust gasses 106 to exhaust aftertreatment 114 to heat exhaust aftertreatment 114 to operating temperatures, as the thermal mass of turbine 110 is avoided, as well as the temperature drop of exhaust gasses 106 associated with powering turbine 110. This use of turbine bypass 102 results in little or no power available to turbine 110 from exhaust gasses 106, which would disable the function of a traditional turbocharger. However, the driven turbocharger 100 can still provide power 118 to compressor 112 through mechanical drive 119 to provide supercharging from engine 104. Supercharging can also be supplied by an electric fan, as set forth below. This way, during utilization of turbine bypass 102, the driven turbocharger 100 still provides engine 104 with boosted airflow 120 to maintain torque and power capabilities of engine 104.

Driven turbocharger 100 of FIG. 1 can be a mechanically driven turbocharger as shown, or can be an electrically driven turbocharger. The operation of driven turbocharger 100 is as taught in U.S. Pat. No. 8,561,403, issued Oct. 22, 2013, entitled "Super-Turbocharger Having a High Speed Traction Drive and a Continuously Variable Transmission," U.S. Pat. No. 8,668,614, issued Mar. 11, 2014, entitled "High Torque Traction Drive," U.S. Pat. No. 8,608,609, issued Dec. 17, 2013, entitled "Symmetrical Traction Drive," U.S. Pat. No. 9,670,832, issued Jun. 6, 2017, entitled "Thrust Absorbing Planetary Traction Drive SuperTurbo," and U.S. Pat. No. 9,581,078, issued Feb. 28, 2017, entitled "Super-Turbocharger Having a High Speed Traction Drive and a Continuously Variable Transmission." U.S. Pat. Nos. 8,561,403, 8,668,614, 8,608,609, 9,670,832, and 9,581,078 are specifically incorporated herein by reference for all that they disclose and teach. Driven turbocharger 100 may be coupled to engine 104 mechanically or electrically, and various configurations of each are possible.

Figure 2A:
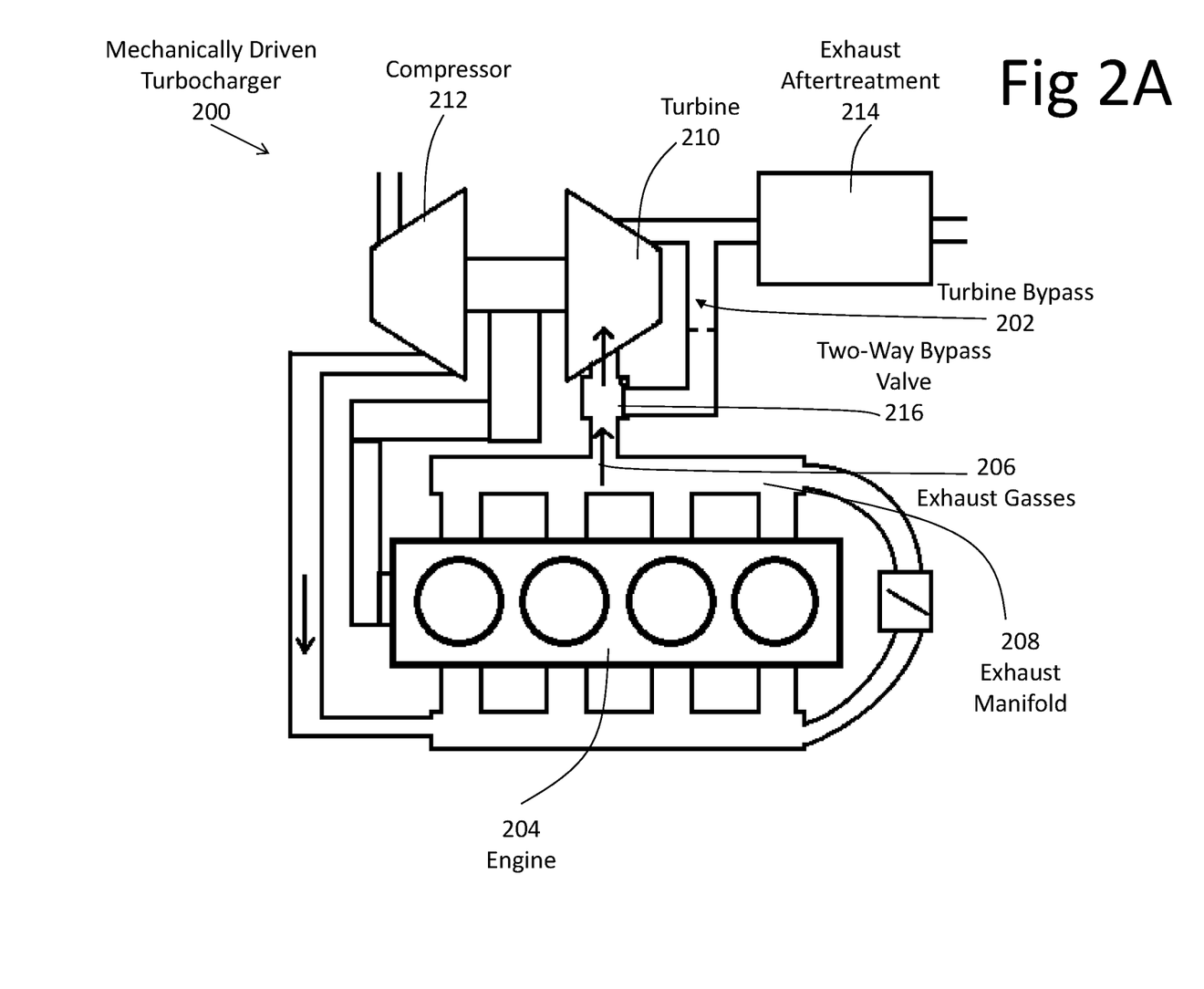
FIG. 2A is a schematic of a mechanically driven turbocharger for an engine with a turbine bypass with a two-way bypass valve in a normal configuration.

FIG. 2A is a schematic of a mechanically driven turbocharger 200 for an engine 204 with a turbine bypass 202 with a two-way bypass valve 216 in a normal configuration. Two-way bypass valve 216 is coupled to exhaust manifold 208 of engine 204, and directs exhaust gasses 206 to either turbine 210 of mechanically driven turbocharger 200 or to turbine bypass 202. For normal operation of engine 204, two-way bypass valve 216 blocks off turbine bypass 202 and directs all of exhaust gasses 206 to turbine 210. Turbine 210 collects energy from exhaust gasses 206, and provides power to compressor 212, as well as to engine 204. After flowing through turbine 210, exhaust gasses 206 flow through exhaust aftertreatment 214. Mechanically driven turbocharger 200 is mechanically coupled to engine 204, and transmits power between engine 204 and turbine 210 and compressor 212. Mechanically driven turbocharger 200 may comprise a traction drive planetary coupled to a continuously variable transmission, but other configurations are possible as well.

Figure 2B:
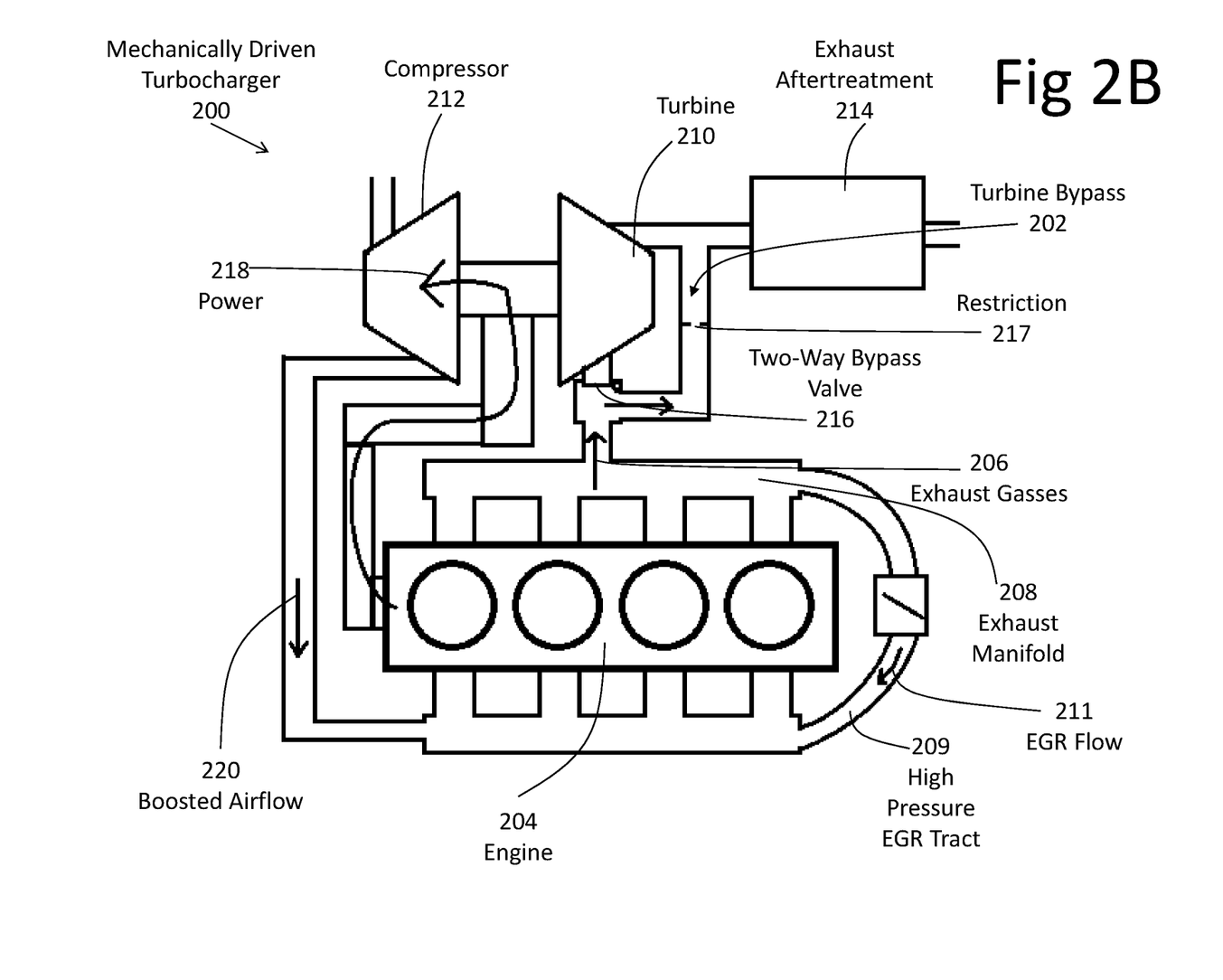
FIG. 2B is a schematic of a mechanically driven turbocharger for an engine with a turbine bypass with a two-way bypass valve in a bypass configuration.

FIG. 2B is a schematic of a mechanically driven turbocharger 200 for an engine 204 with a turbine bypass 202 with a two-way bypass valve 216 in a bypass configuration. For cold start, idle, or low load operation of engine 204, additional heat may be necessary for exhaust aftertreatment 214 to reach and maintain operational temperature. Two-way bypass valve 216 blocks off turbine 210 and directs all of exhaust gasses 206 to turbine bypass 202. This provides higher temperatures of exhaust gasses 206 to exhaust aftertreatment 214, as heat transfer and power absorption of turbine 210 is eliminated from exhaust gasses 206. When turbine bypass 202 is active, turbine 210 does not collect energy, but mechanically driven turbocharger 200 may provide power 218 to compressor 212 from engine 204 to provide boosted airflow 220 to engine 204 to maintain torque and power capabilities of engine 204. As shown in FIGS. 2A and 2B, two-way valve 202 is located between exhaust manifold 208 and turbine 210 and provides exhaust gasses 206 entirely to either turbine 210 or turbine bypass 202 depending on the operation conditions of engine 204 and temperature of exhaust aftertreatment 214. An electrically driven turbocharger may also be used as well.

Also shown in FIG. 2B is a restriction 217 in turbine bypass 202 that provides pressure to exhaust manifold 208 to enable EGR flow 211 through a high pressure EGR tract 209 when turbine bypass 202 is in use. When two-way bypass valve 216 is in a bypass configuration, the exhaust gasses 206 may flow freely to exhaust aftertreatment 214. This reduces the pressure in exhaust manifold 208, so that EGR flow 211 through high pressure EGR tract 209 is not possible. By adding in a restriction 217 to turbine bypass 202, higher pressure in exhaust manifold 208 can be maintained, enabling EGR flow 211 through high pressure EGR tract 209. This EGR flow 211 can help reduce NOx emissions from engine 204 when turbine bypass 202 is in use. Restriction 217 may be an orifice plate, a valve, or even a design diameter of pipe, or any other mechanism that provides a pressure drop through turbine bypass 202. Restriction 217 may be a fixed part such as an orifice plate to maintain simplicity and minimize cost, or restriction 217 may be a variable device such as a controlled valve to allow for optimal tuning of the pressure in exhaust manifold 208. Minimizing the surface area and mass of restriction 217 can help to minimize heat transfer from exhaust gasses 206 to keep exhaust gasses 206 hot. During normal operation of engine 204, turbine bypass 202 is not in use, so restriction 217 does not affect engine 204.

Figure 3:
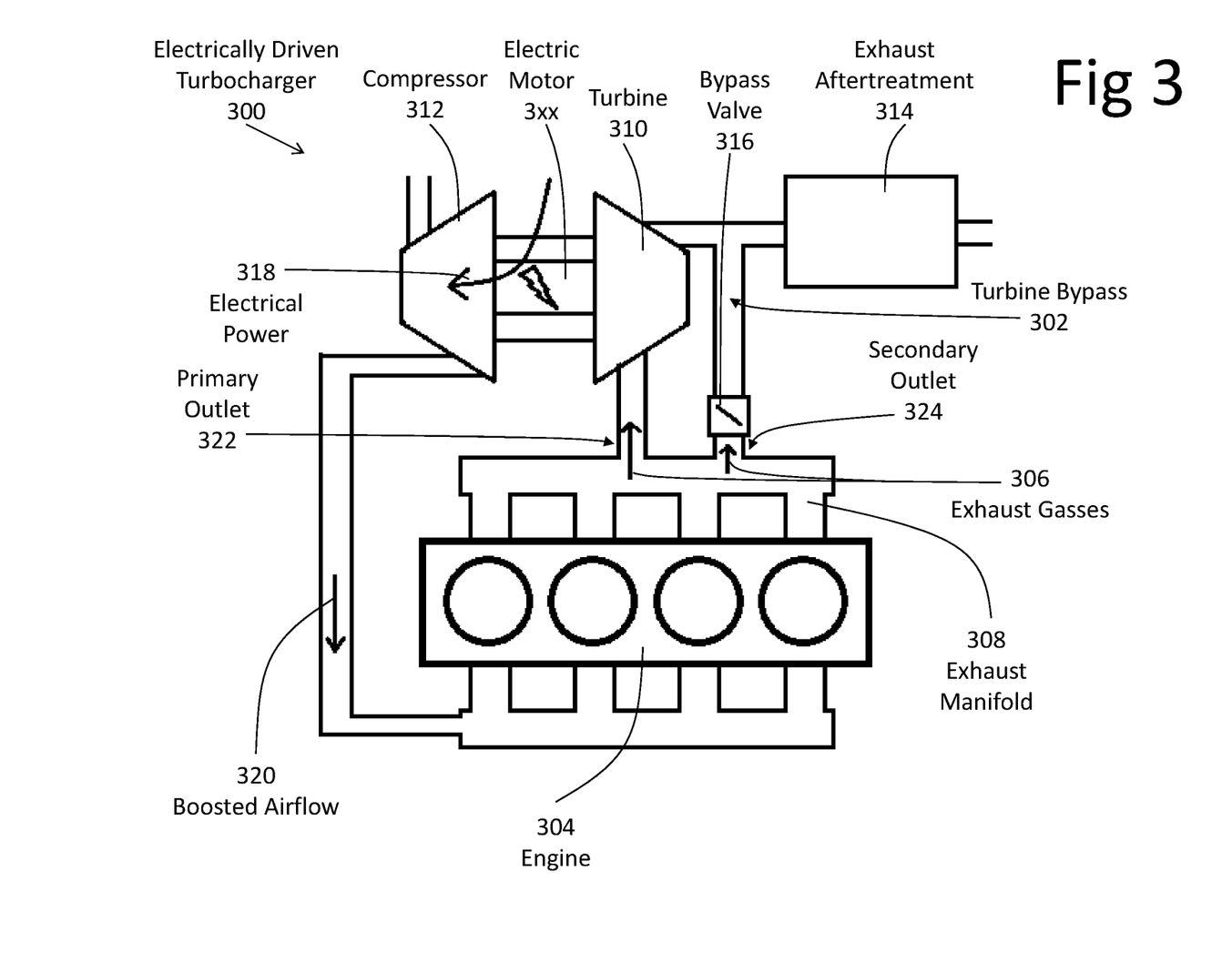
FIG. 3 is a schematic of an electrically driven turbocharger with a turbine bypass coupled to a secondary outlet of an exhaust manifold.

FIG. 3 is a schematic of an electrically driven turbocharger 300 with a turbine bypass 302 coupled to a secondary outlet 324 of an exhaust manifold 308. Exhaust manifold 308 has a primary outlet 322 that is coupled to turbine 310 of electrically driven turbocharger 300 and provides exhaust gasses 306 to turbine 310. Having bypass valve 316 and turbine bypass 302 coupled to a separate, secondary outlet 324 of exhaust manifold may provide more flexible packaging of turbine bypass 302, as well as decreasing the amount of weight supported by primary outlet 322 of exhaust manifold 308, which can improve the mechanical integrity of the connection between primary outlet 322 of exhaust manifold 308 and turbine 310. Bypass valve 316 is closed during normal operation of engine 304, so that all of exhaust gasses 306 flow through turbine 310. When additional heating of exhaust aftertreatment 314 is necessary, bypass valve 316 opens to allow exhaust gasses 306 to flow through turbine bypass 302 directly to exhaust aftertreatment 314. When turbine bypass is active, turbine 310 may no longer provide sufficient power for compressor 312 of electrically driven turbocharger 300, but electrically driven turbocharger 300 can use electrical power 318 to drive compressor 312 to provide boosted airflow 320 to engine 304 to maintain torque and power capabilities of engine 304. A mechanically driven turbocharger may also be used as well.

Figure 4:
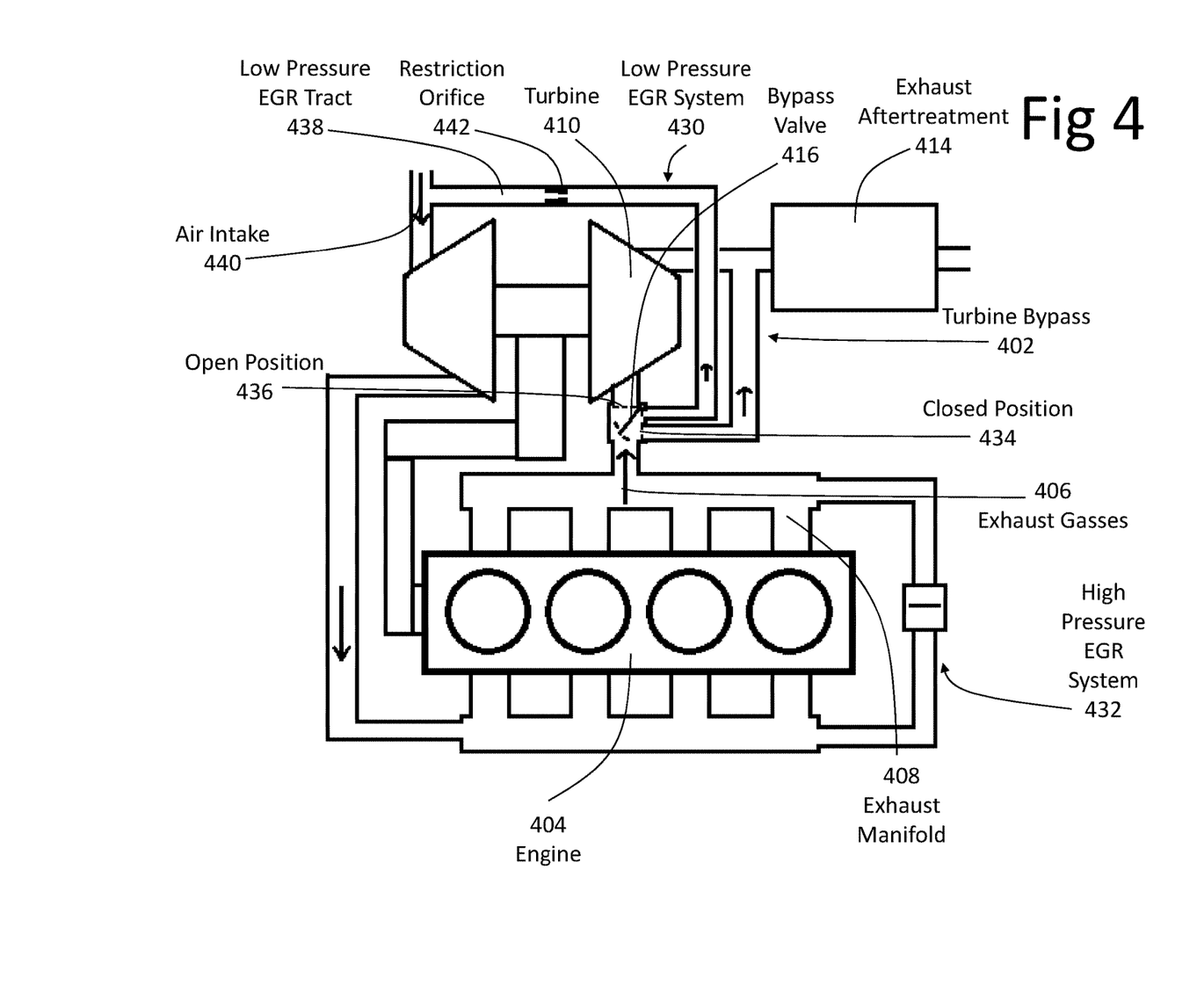
FIG. 4 is a schematic of a turbine bypass coupled to a low pressure EGR system.

FIG. 4 is a schematic of a turbine bypass 402 coupled to a low pressure EGR system 430. Most diesel engines utilize EGR to reduce NOx emissions, usually through a high pressure EGR system 432. During normal operation of engine 404, bypass valve 416 is in a closed position 434, directing exhaust gasses 406 from exhaust manifold 408 to turbine 410, and high pressure EGR system 432 is active. During use of turbine bypass 402, bypass valve 416 is in an open position 436, directing flow of exhaust gasses 406 to turbine bypass 402, which lowers the pressure in exhaust manifold 408. High pressure EGR system 432 needs sufficient pressure in exhaust manifold 408 to operate, so may not be able to function when turbine bypass 402 is active. If EGR use is needed by engine 404 to reduce NOx emissions when turbine bypass 402 is active, a low pressure EGR system 430 can be used. Low pressure EGR system 430 directs exhaust gasses 406 through a low pressure EGR tract 438 to air intake 440 to provide engine 404 with EGR. If low pressure EGR system 430 is used only when turbine bypass 402 is active to heat up exhaust aftertreatment 414, any cooling of EGR can be avoided to increase the temperature of exhaust gasses 406. As shown, low pressure EGR tract 438 is coupled to turbine bypass 402, but more standard variations of low pressure EGR system 430 can be used as well. When low pressure EGR tract 438 is coupled to turbine bypass 402, the system can be set up so that bypass valve 416 controls flow of exhaust gasses 406 to both turbine bypass 402 and low pressure EGR tract 438. In this way, a single actuator bypass valve 416, is used to activate both turbine bypass 402 and low pressure EGR system 430. During normal operation of engine 404, bypass valve 416 is in a closed position 434, which makes both turbine bypass 402 and low pressure EGR system 430 inactive and prevents flow through both. When bypass valve 416 is moved to open position 436, exhaust gasses 406 are directed to both turbine bypass 402 and low pressure EGR tract 438. A restriction orifice 442 can be included inside of low pressure EGR tract 438 that is designed to deliver a desired amount of EGR to air intake 440 when bypass valve 416 is in an open position 436, so that additional variable valves in low pressure EGR system 430 are not needed.

Figure 5:
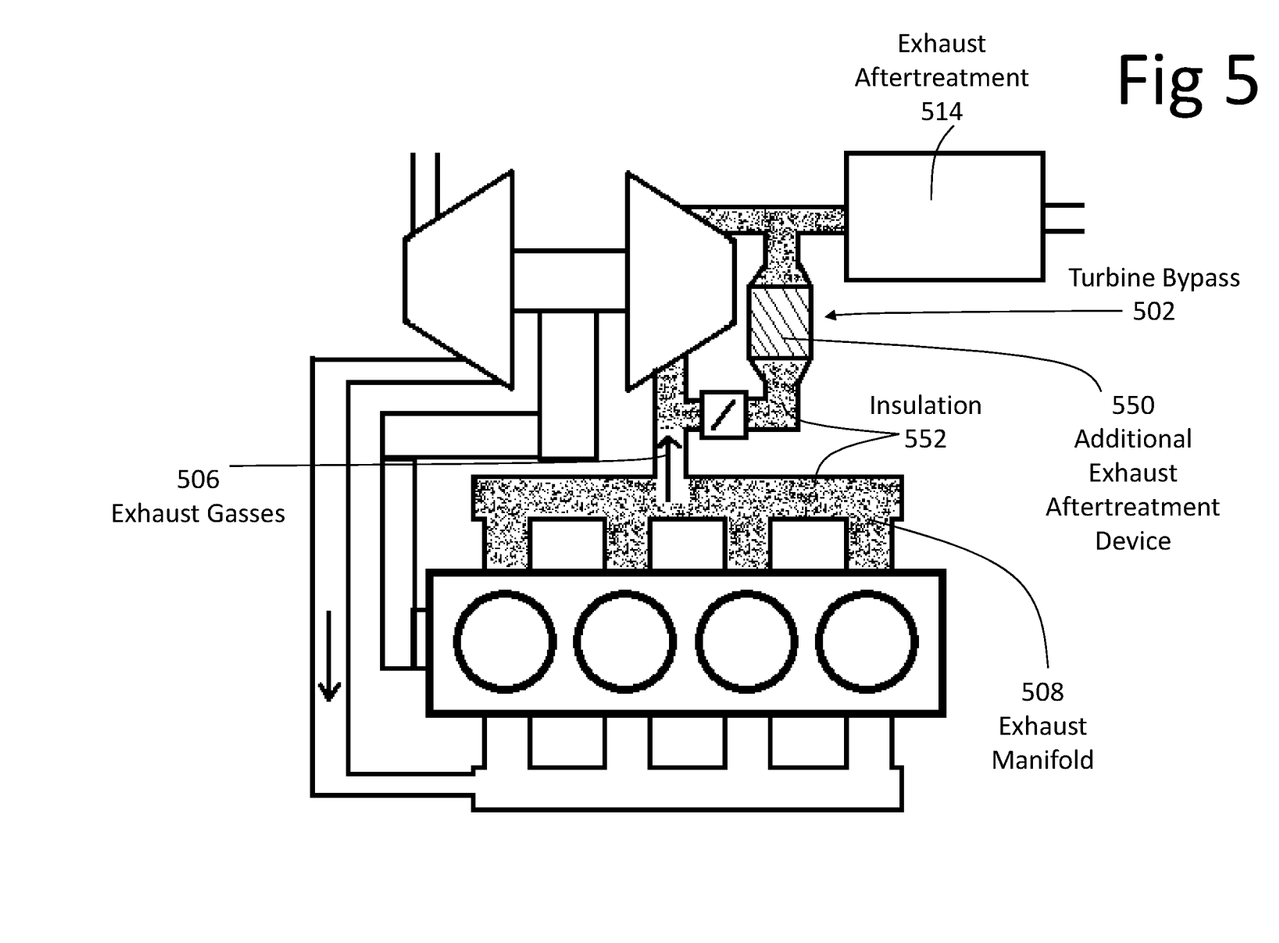
FIG. 5 is a schematic of a turbine bypass with an additional exhaust aftertreatment device and insulation.

FIG. 5 is a schematic of a turbine bypass 502 with an additional exhaust aftertreatment device 550 and insulation 552. When exhaust aftertreatment 514 is below operational temperature, and turbine bypass 502 is active, additional exhaust aftertreatment device 550 can help reduce emissions in exhaust gasses 506 that would otherwise be released. Additional exhaust aftertreatment device 550 may consist of a lean NOx trap or a passive NOx adsorber, but other types of devices as well as combinations may be used as well. For a lean NOx trap or a passive NOx adsorber, NOx emissions are trapped when turbine bypass 502 is active. When exhaust aftertreatment 514 has been heated up to operating temperature, the NOx can be released and then properly reduced by exhaust aftertreatment 514. Essentially, additional exhaust aftertreatment device 550 can trap harmful emissions until exhaust aftertreatment 514 is operational. Also shown in FIG. 5 is insulation 552 that is wrapped around exhaust manifold 508 and turbine bypass 502. The addition of insulation 552 helps keep the temperature of exhaust gasses 506 high, to further heat up exhaust aftertreatment 514. Both additional exhaust aftertreatment device 550 and insulation 552 may be used in any of the configurations discussed in FIGS. 1-4.

Figure 6:
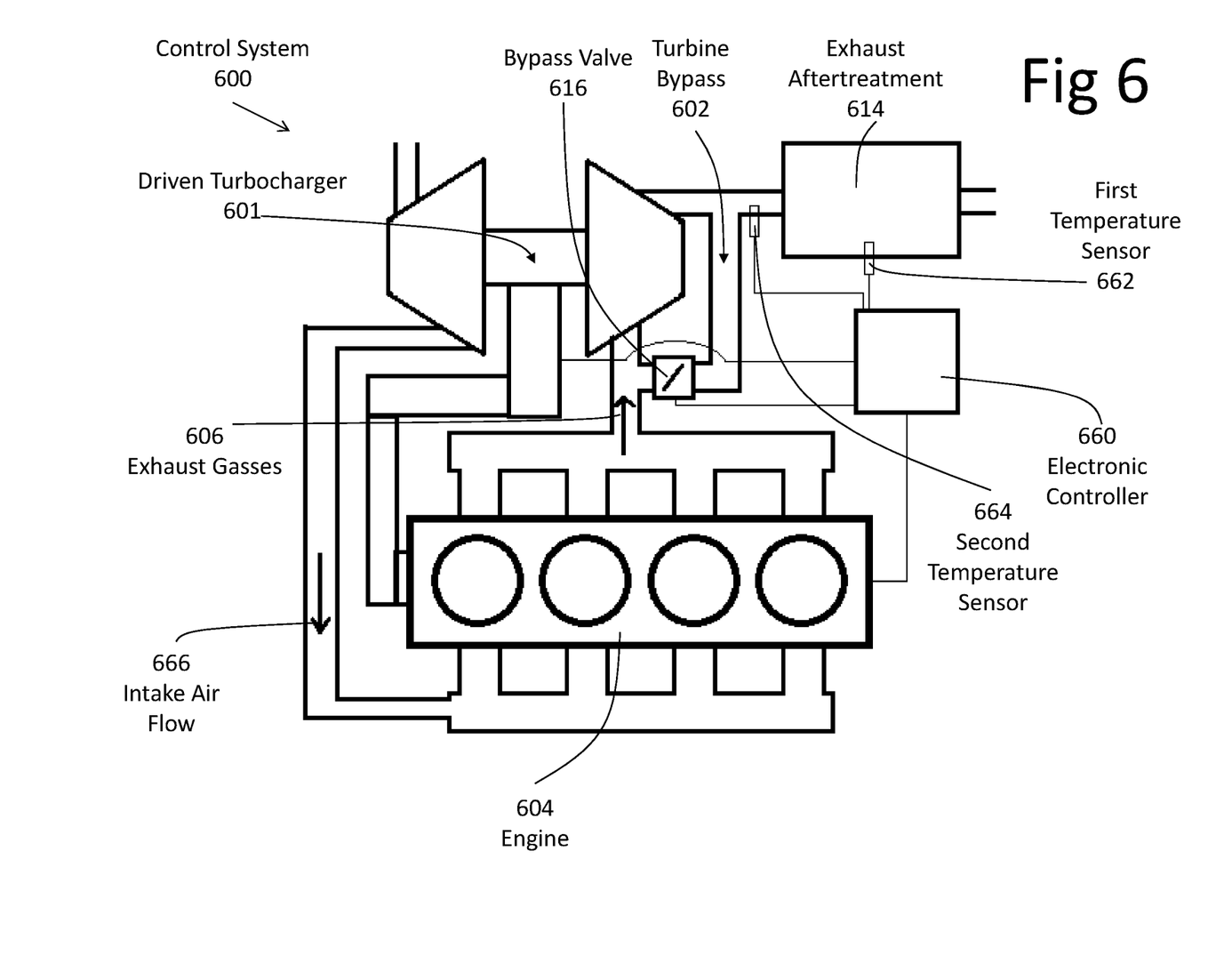
FIG. 6 is a schematic of a control system for regulating the temperature of exhaust aftertreatment.

FIG. 6 is a schematic of a control system 600 for regulating the temperature of exhaust aftertreatment 614. Electronic controller 660 sends electronic signals to control various parts, including engine 604, driven turbocharger 601, and bypass valve 616. To monitor the operability of exhaust aftertreatment 614, first temperature sensor 662 sends a measurement of the temperature of exhaust aftertreatment 614 to electronic controller 660. Electronic controller 660 compares this temperature measurement to an operational threshold temperature of exhaust aftertreatment 614, and commands the opening of bypass valve 616 to provide exhaust gasses 606 through turbine bypass 602 to exhaust aftertreatment 614 when the measured temperature of exhaust aftertreatment 614 is below the operational threshold. Additionally, electronic controller 660 can receive a measured temperature of exhaust gasses 606 from a second temperature sensor 664. If the measured temperature of exhaust gasses 606 is below the operational threshold of exhaust aftertreatment 614, electronic controller 660 can command engine 604 to increase in speed to increase the temperature of exhaust gasses 606 to a desired level to heat up exhaust aftertreatment 614. Another mode of control that can be utilized by electronic controller 660 is control of intake air flow 666 to engine 604 by controlling the rotational speed of driven turbocharger 601. Since driven turbocharger 601 can receive power from engine 604, the rotational speed of driven turbocharger 601 can be controlled independently from the flow of exhaust gasses 606. Increasing the speed of driven turbocharger 601 can increase the flow rate of intake air flow 666 and exhaust gasses 606. During cold start of engine 604, the rate of heat flux to exhaust aftertreatment 614 can be more important than the temperature of exhaust gasses 606. Increasing the flow rate of exhaust gasses 606 can increase the level of heat flux to exhaust aftertreatment 614, so electronic controller 660 can control the rotational speed of driven turbocharger 601 to provide a desired level of heat flux to the exhaust aftertreatment 614. Control system 600 can control various aspects of the system, including bypass valve 616, engine 604, and driven turbocharger 601 to provide a desired flow rate and temperature of exhaust gasses 606 to exhaust aftertreatment 614 for thermal management of exhaust aftertreatment 614.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for activating an exhaust aftertreatment in an engine having a driven turbocharger and an intake manifold comprising:
    a compressor that compresses air that is applied to said intake manifold;
    an exhaust manifold;
    a turbine that is driven by exhaust gases from said exhaust manifold;
    a drive that is coupled to said compressor that drives said compressor to provide boosted airflow to said intake manifold;
    an exhaust aftertreatment located downstream from said turbine;
    a turbine bypass that is coupled to said exhaust manifold and an input to said exhaust aftertreatment;
    a bypass valve coupled to said turbine bypass that redirects said exhaust gases around said turbine and directly to said exhaust aftertreatment;
    an electronic controller that opens said bypass valve during cold start, low load and idle conditions of said engine, so that said exhaust gases from said exhaust manifold are sent directly to said exhaust aftertreatment, and that engages said drive so that said compressor provides boosted airflow to said intake manifold when said bypass valve redirects said exhaust gases directly to said exhaust aftertreatment, which maintains torque and power of said engine while said exhaust gases are redirected around said turbine;
    a restriction in said turbine bypass that creates back pressure in said exhaust manifold to enable EGR flow through a high pressure EGR tract.

2. The system of claim 1 where said bypass valve is a two-way valve located between said exhaust manifold and said turbine that provides said exhaust gases entirely to either said turbine or said turbine bypass.

3. The system of claim 1 where said turbine is coupled to a primary outlet of said exhaust manifold and said bypass valve is coupled to a secondary outlet of said exhaust manifold.

4. The system of claim 1 further comprising insulation that is wrapped around said exhaust manifold and said turbine bypass to further increase exhaust gas temperatures provided to said exhaust aftertreatment.

5. The system of claim 1 further comprising:
    a low pressure EGR tract coupled to said turbine bypass that provides EGR flow to said engine when said turbine bypass is active.

6. The system of claim 5 where said bypass valve controls flow of said exhaust gases to both said turbine bypass and said low pressure EGR tract.

7. The system of claim 1 wherein said drive is a mechanical drive.

8. The system of claim 1 wherein said drive is an electric motor.

9. A method of activating an exhaust aftertreatment during cold start, low load and idle conditions of an engine, said engine having a driven turbocharger comprising:
   diverting exhaust gases around a turbine of said driven turbocharger during said cold start, low load and idle conditions to cause said exhaust gases to be redirected from said turbine directly to said exhaust aftertreatment;
   driving a compressor, that provides compressed air to an intake manifold of said engine, to boost airflow to said intake manifold when said exhaust gases are diverted around said turbine, which maintains torque and power capabilities of said engine;
   restricting flow of said exhaust gases in a turbine bypass that creates pressure in said exhaust manifold to enable EGR flow through a high pressure EGR tract.

10. The method of claim 9 wherein said method of diverting said exhaust gases comprises diverting said exhaust gases entirely to either said turbine or to said exhaust aftertreatment.

11. The method of claim 9 further comprising:
    connecting said turbine to a primary outlet of an exhaust manifold;
    connecting a bypass valve to a secondary outlet of said exhaust manifold.

12. The method of claim 9 further comprising:
    wrapping an exhaust manifold and a turbine bypass with insulation.

13. The method of claim 9 further comprising: coupling a low pressure EGR tract to a turbine bypass to provide EGR flow to said engine when said turbine bypass is active.

14. The method of claim 13 further comprising:
    controlling flow of said exhaust gases to both said turbine bypass and said low pressure EGR tract with a bypass valve.

15. The method of claim 9 wherein said method of driving said compressor comprises driving said compressor with mechanical rotational energy from said engine.

16. The method of claim 9 wherein said method of driving said compressor comprises driving said compressor with an electric motor.

17. The method of claim 9 further comprising:
    measuring a temperature of said exhaust aftertreatment;
    opening a bypass valve to divert said exhaust gases through a turbine bypass to said exhaust aftertreatment when said temperature of said exhaust aftertreatment is below an operational threshold.

18. The method of claim 17 further comprising:
    measuring a temperature of said exhaust gases;
    increasing rotational speed of said engine to increase said temperature of said exhaust gases to a desired level.

19. The method of claim 17 further comprising:
    controlling rotational speed of said driven turbocharger to provide a desired level of heat flux to said exhaust aftertreatment.

* * * * *